March 21, 1939.  E. A. SLYE ET AL  2,151,239

GEARING FOR LIQUID DISPENSING APPARATUS

Filed May 27, 1935  7 Sheets-Sheet 1

Inventors
Edward Wild
James B. Hoye
Harvey L. Spaunburg
& Edward A. Slye
By: Aichinson, Huxley, Byron & Knight
Attys March 21, 1939.  E. A. SLYE ET AL  2,151,239

GEARING FOR LIQUID DISPENSING APPARATUS

Filed May 27, 1935  7 Sheets-Sheet 2

Inventors
Edward Wild
James B. Hoye
Harvey L. Spaunburg
& Edward A. Slye

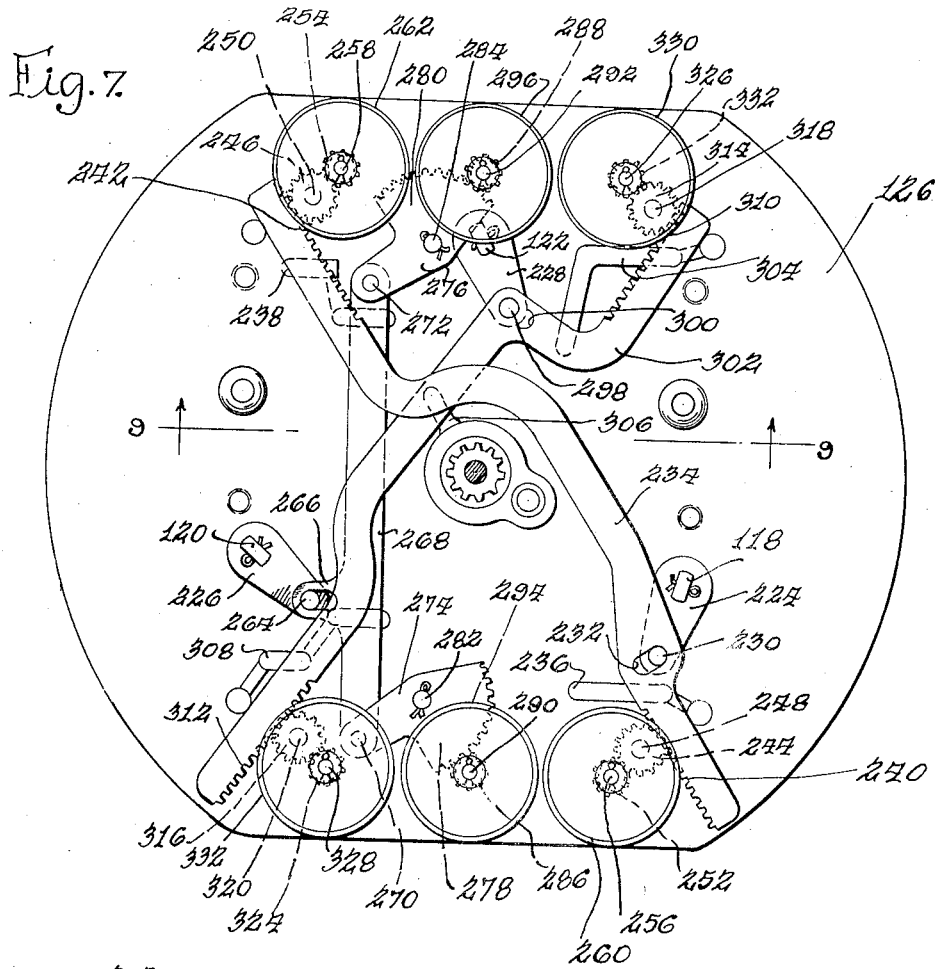
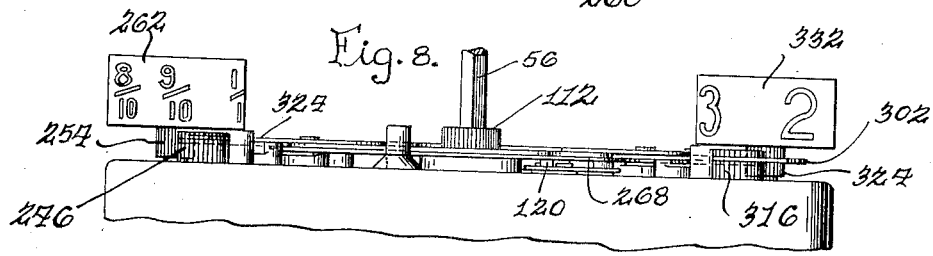
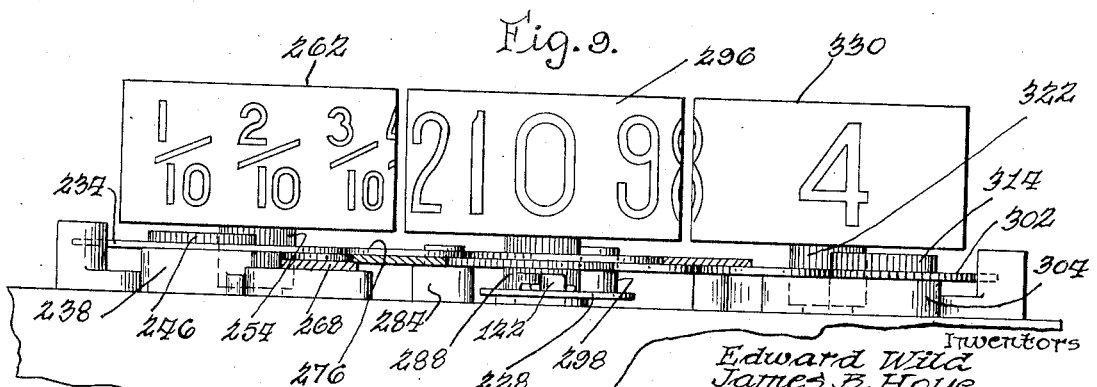

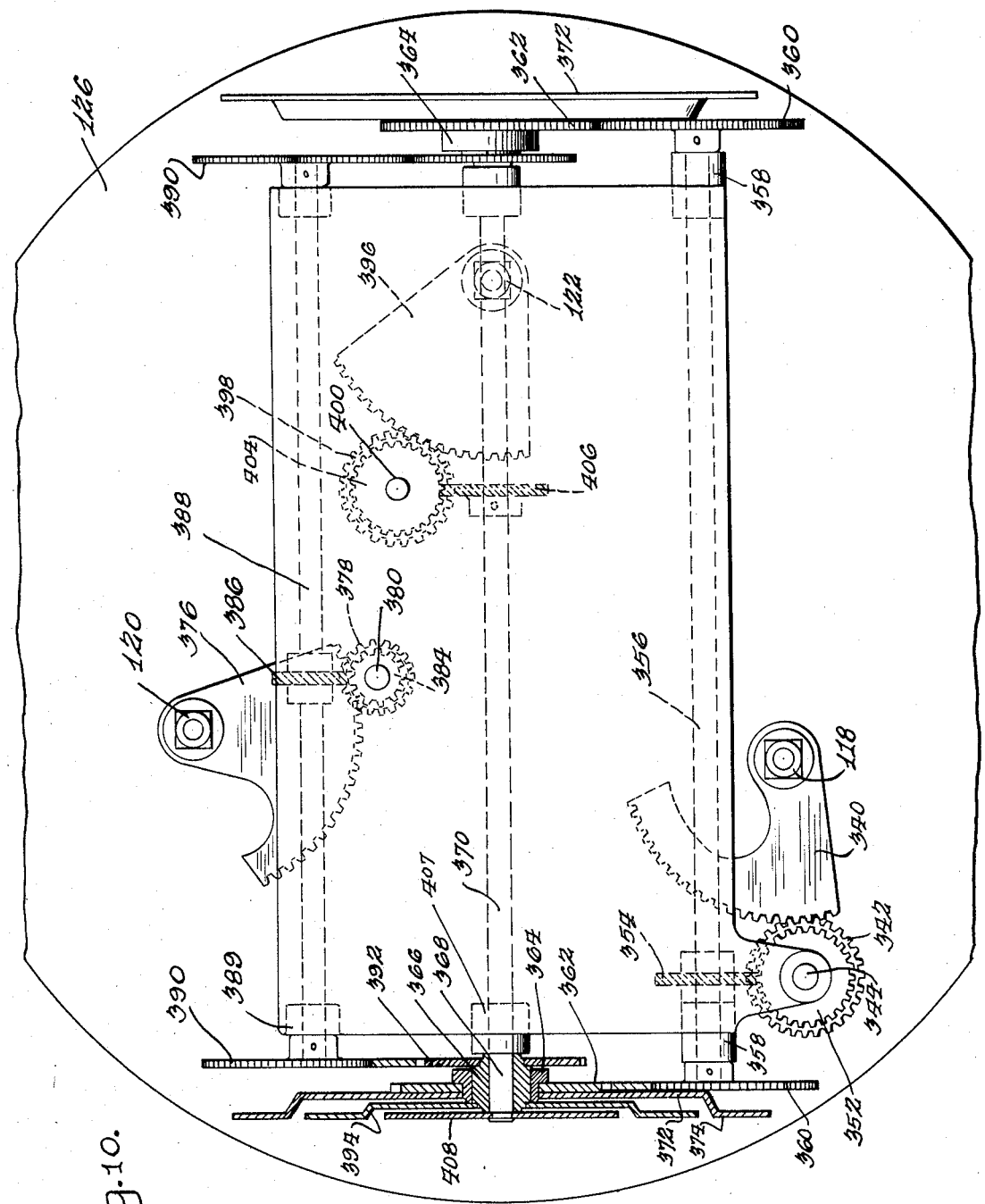

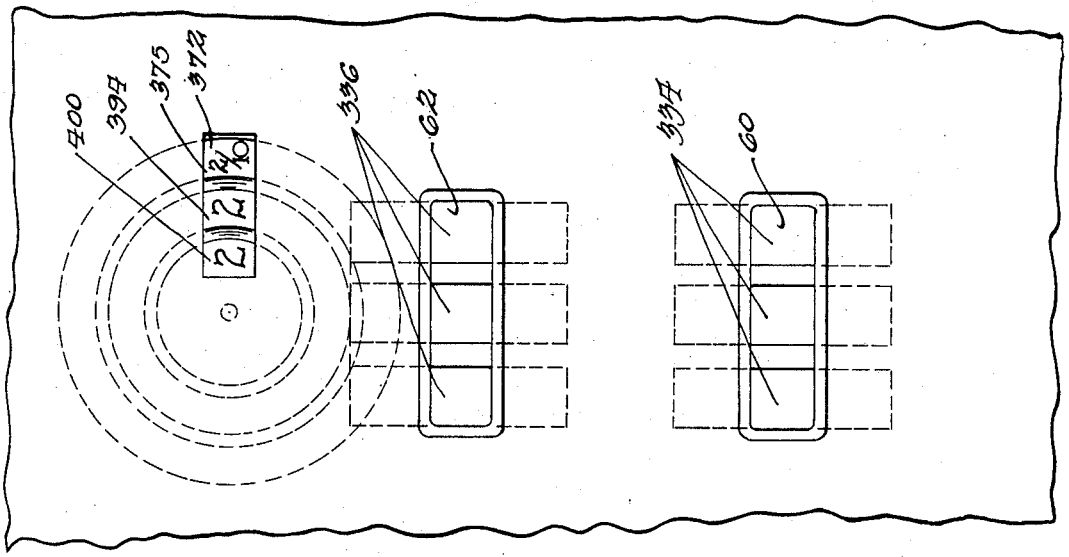
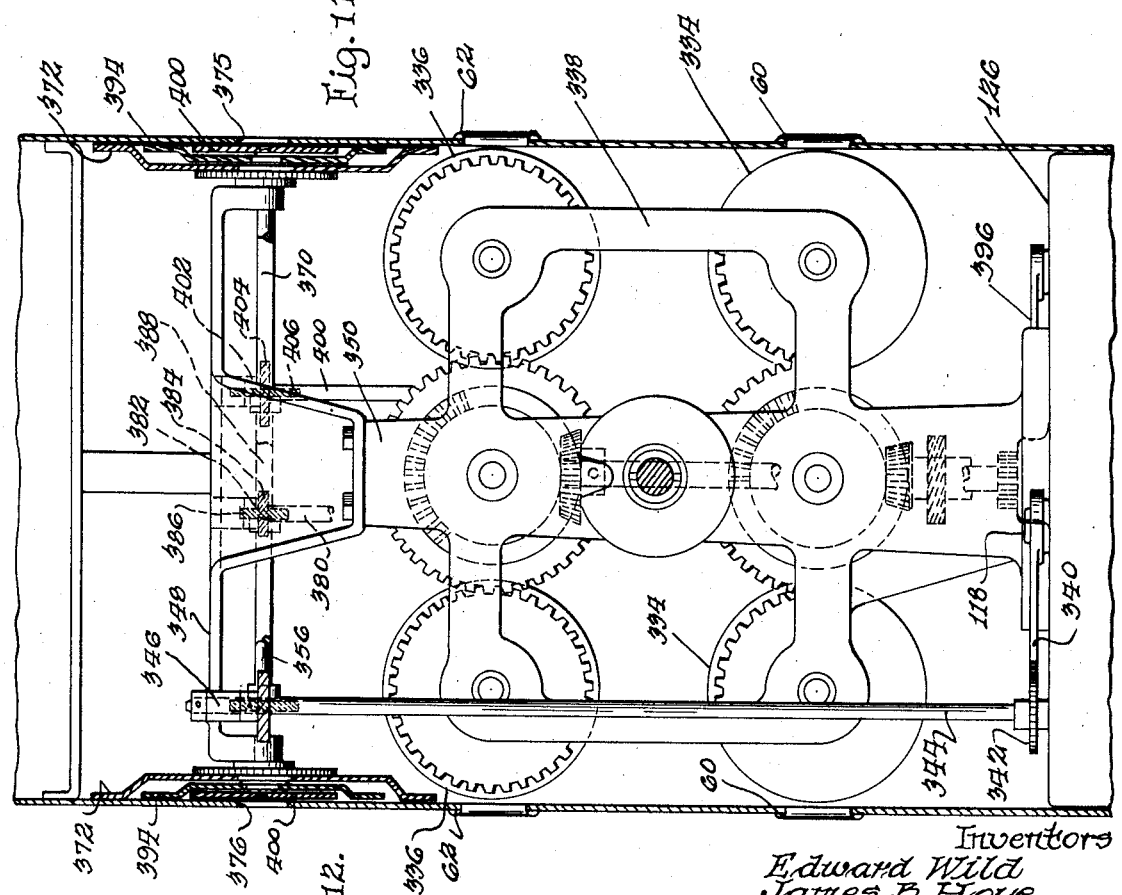

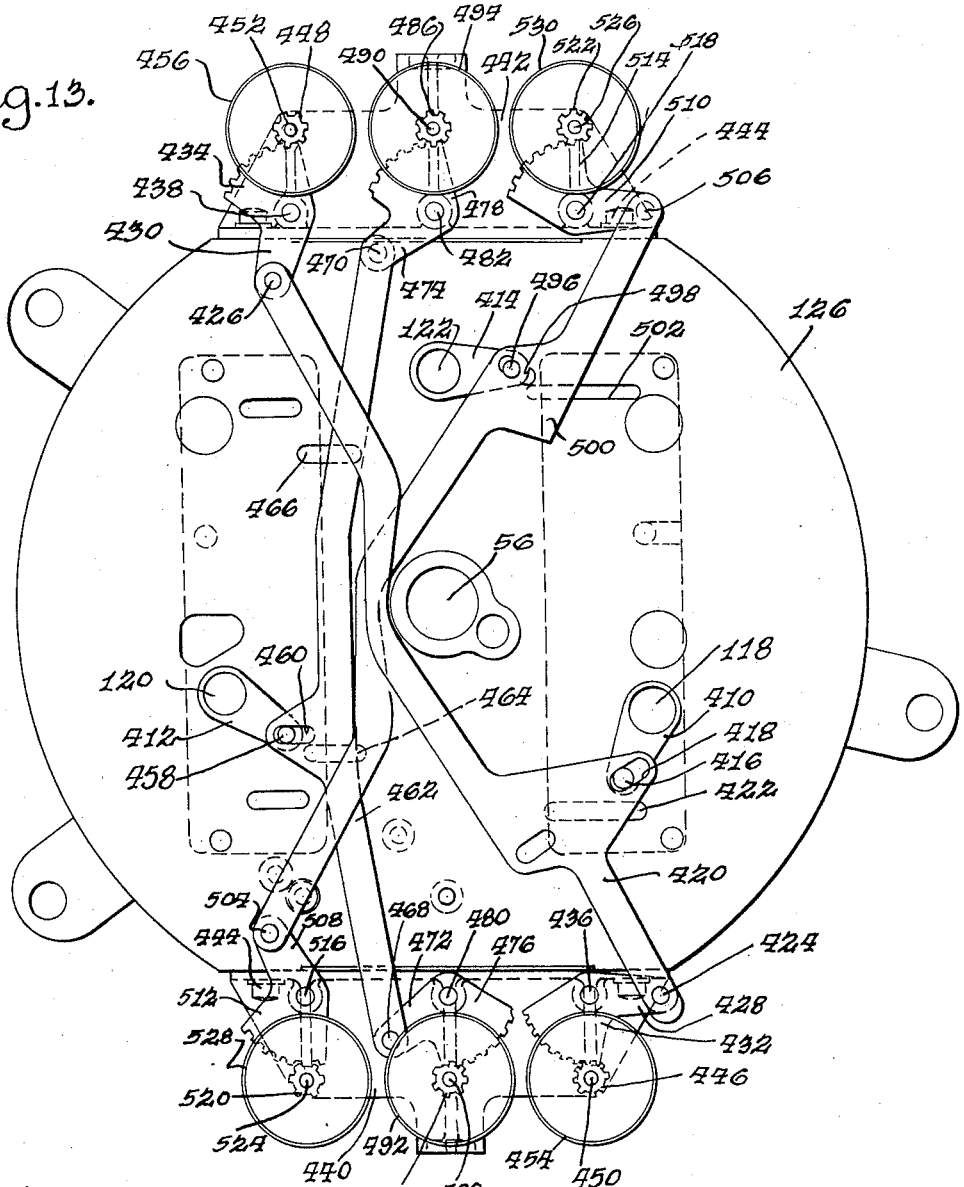

Patented Mar. 21, 1939

2,151,239

UNITED STATES PATENT OFFICE 2,151,239

GEARING FOR LIQUID DISPENSING APPARATUS

Edward A. Slye, East Hartford, and Edward Wild and James B. Hoye, Hartford, and Harvey L. Spaunburg, Bristol, Conn., assignors, by mesne assignments, to The Wayne Pump Company, Fort Wayne, Ind., a corporation of Maryland Application May 27, 1935, Serial No. 23,742

19 Claims. (Cl. 74—283)

This invention pertains to gearing for liquid dispensing apparatus.

Liquid dispensing apparatus now in use are of two principal types, namely, the so-called visible type, and the meter type. The more desirable of these two types is the meter type, which consists essentially of an operating pump connected to a source of liquid supply, the pump being adapted to supply liquid to a meter where it is measured, after which it is dispensed through the usual hose and nozzle connection. The meter is adapted to operate a clock or other recording mechanism to show the amount of liquid dispensed through the hose and nozzle. It is customary to provide this type of liquid dispensing apparatus with a card to be displayed somewhere on the casing adjacent the clock, the card being used to compute the price of any amount of gasoline or other liquid dispensed from the device. The objections to this method of computation are that for different localities different cards must be used as the prices vary, and of course the prices vary for the same localities from time to time. There is then the liability that the cards may not be supplied at the proper time, and also the objection that the figures on the computing card are so small that the customer purchasing gasoline from a dispensing station cannot see the numerals from his automobile, there being grave dangers of error in either case. There is a further objection that the prices on these cards are only for full gallon units, and if a fraction of a gallon is dispensed there is no way of accurately determining the cost of this amount. Also, in meter pumps there is no positive way to dispense only a unit, and so in case the registering hand of the clock overruns the unit measure, either the customer has to pay an estimated amount, or the service station owner has to lose this fraction of a unit to the customer.

In order to provide a liquid dispensing apparatus which will fulfill all service requirements, a computing pump has been devised wherein both price and the amount dispensed are indicated. This pump consists essentially of a motor driven pump, a meter, and a dispensing hose connected to the meter through a sight gauge, the meter being preferably of the displacement type for operating the indicating device.

The indicating device includes a variator which provides a ready adjustment between the amount computing portion of the clock and the price computing portion. In order to indicate the current price, numeral wheels or other indicia are provided above the meter so that the customer can readily see the prevailing price. As the current price changes, it is of course necessary to reset the computing device or the variator whereby a proper compensation is provided between the price and the amount; and in the present application means is provided between the current price indicia and the variator whereby the current price is regulated and controlled directly by the setting means of the variator.

It is therefore an object of this invention to provide a liquid dispensing apparatus which itself registers both the amount of liquid dispensed and also registers the total price of such liquid dispensed.

Another object is to provide a liquid dispensing apparatus wherein means is provided for indicating the total price of any amounts of liquid dispensed, as for example gallons or fractions thereof, the means being adjustable at the liquid dispensing apparatus to correspond to any price variations of units dispensed.

A further object is to provide a readily adjustable variator means, and operating means interposed between said variator means and the current price indicia whereby the current price indicia is regulated by the variator means.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 7 is an enlarged fragmentary elevation of the computer clock or counter having associated therewith the speed variator or computing mechanism, and a modified form of price synchronizing means;

Figure 8 is a fragmentary side elevation of the price synchronizing means illustrated in Figure 7 as viewed from the left of said figure;

Figure 9 is an enlarged fragmentary sectional elevation taken substantially in the plane as indicated by the line 9—9 of Figure 7;

Figure 10 is an enlarged fragmentary top plan view of yet another form of prevailing price indicator mechanism;

Figure 11 is an enlarged fragmentary side elevation of the liquid dispensing apparatus showing the visible indication of the price indicating means shown in Figure 10;

Figure 12 is an enlarged fragmentary sectional elevation taken through the counter mechanism of the prevailing price mechanism illustrated in Figures 10 and 11;

Figure 13 is an enlarged fragmentary elevation of the computer clock or counter having associated therewith the speed variator or computing mechanism, and another modified form of price synchronizing means;

Figure 14 is a side elevation of the price interlock construction illustrated in Figure 13.

Figure 1:
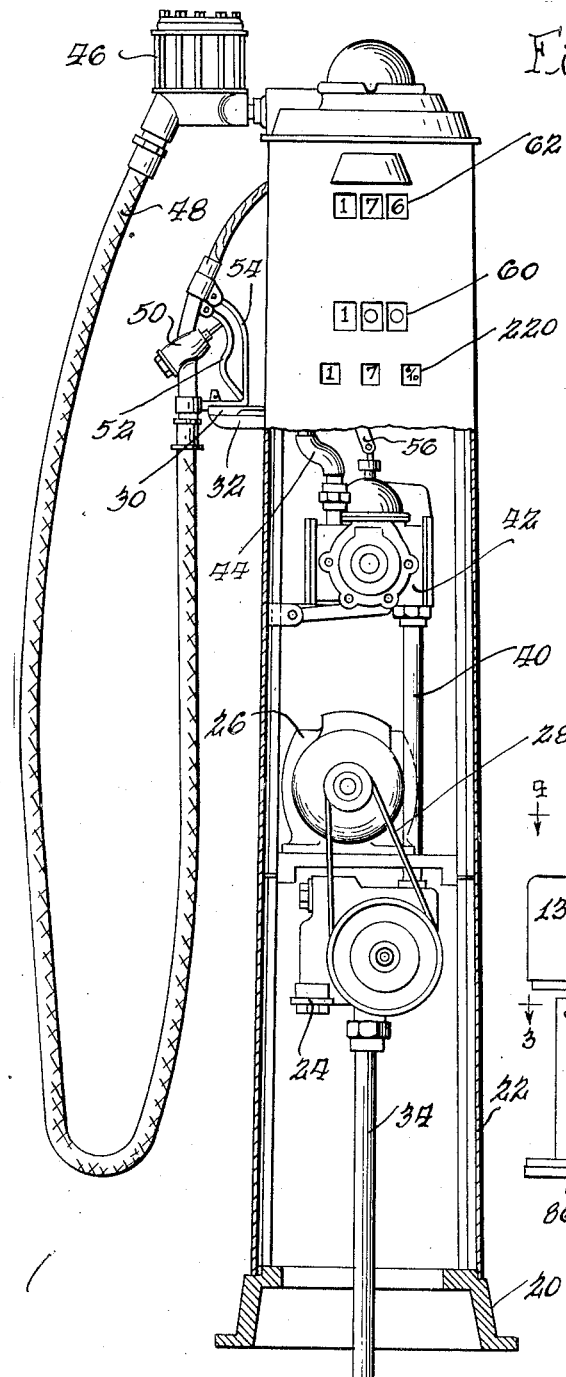
Figure 1 is an elevation partly in section of a pump or liquid dispensing apparatus of the computer type having the price synchronizing means applied thereto.
Figure 2:
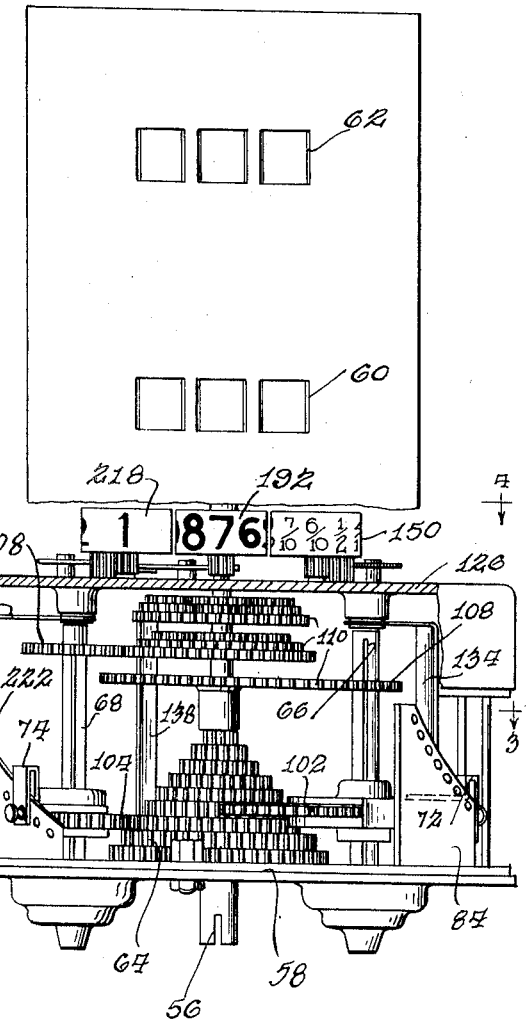
Figure 2 is an enlarged fragmentary elevation of the computer clock or counter having associated therewith the speed variator or computing mechanism and the price synchronizing means.

Referring first of all more particularly to the assembly illustrated in Figure 1, the pump or liquid dispensing apparatus consists essentially of the pedestal 20 provided with the pump casing 22 in which the pump 24 is supported, the pump illustrated being actuated by the motor 26 connected to said pump by means of the belt or chain 28. The pump is controlled by means of a switch (not shown) operated by means of the switch control member 30 provided adjacent the stationary hose hook support 32. The suction side of the pump is connected through the pipe 34 to the source of liquid supply 36 through the foot valve 38 provided on said pipe.

The outlet side of the pump is connected through the pipe 40 to the inlet side of the meter 42, the meter shown being of the displacement type. The outlet side of the meter is connected through the pipe 44 to the sight gauge 46 through which liquid passes, being supplied to the hose 48 provided with the nozzle 50. The nozzle 50 is provided with a valve adapted to be actuated by the lever 52 provided within the supporting guard 54. It is to be noted that when the nozzle is supported on the hose hook 32, the switch operating member 30 cannot be operated to close the switch to actuate the motor.

The meter 42 is provided with the meter shaft 56 adapted to operate the variator mechanism 58 whereby rotation of the meter shaft 56 caused by dispensing of gasoline through the nozzle, will cause the number of gallons dispensed to be indicated by the numeral wheels in the window 60, and the cost of said liquid dispensed to be indicated by numeral wheels in the window 62. The variator and clock mechanism is similar to that shown and described in application Serial No. 2,282, filed January 17, 1935.

The variator mechanism consists essentially of a gear cone 64 adapted to be rotated by the meter shaft 56. The meter shaft passes through the variator and directly operates the gallon numeral wheels of the window 60. Disposed adjacent the gearcone 64 three shafts are provided. Shaft 66, in the construction shown, is for computing tenths of a cent, the range being from one-tenth to nine-tenths of a cent. The shaft 68 is for computing cents, the range being from one to nine cents. The shaft 70 is adapted to indicate tens of cents, the range being from ten to forty cents.

It is of course appreciated that for any other monetary system different ranges will prevail, or different ranges may be used in the embodiment shown. It will be sufficient, however, for the purpose of this invention, to describe it as adapted for United States money, and with the price range indicated above.

Each of the shafts 66, 68 and 70 is provided with a gear shifting lever 72, 74 and 76 provided with pins or other locking means 78, 80 and 82 adapted to engage the graduated apertures upon the adjacent range quadrants 84, 86 and 88. The gear shifting levers are journaled for sliding movement on their respective shafts, the shafts being provided with gears 90, 92 and 94 non-rotatably mounted on the respective shafts, but slidable thereon with the gear shifting levers. The gear shifting levers are provided with the extension arms 96, 98 and 100 provided with the pivoted gears 102, 104 and 106 rotatably mounted on said members and constantly meshing with their associated gears 90, 92 and 94, and adapted to be moved to engage the different gear steps upon the gear cone 64, it being understood that when the pins are engaged in their respective apertures in the quadrants the gears are meshed with the gears of the cone.

As the gear steps on the cone are graduated, obviously the apertures in the quadrants engageable by the respective pins are in different vertical planes so that the gear shifting levers rotate with respect to their respective shafts in changing the price at which the variator is set for computing. The shafts 66, 68 and 70 are provided with gearing indicated generally at 108 for transferring the motion through differential means indicated generally at 110 to a single geared shaft 112 which extends into the counter and is adapted to operate the price numeral wheels in the window 62 in a manner described in said above referred to application.

It is to be noted that, as the meter shaft 56 operates the numeral wheels in the window 60 showing the gallons dispensed, and as it operates the gear cone 64 which in turn operates the variating mechanism to operate the numeral wheels in the window 62, to show the price of the gallons dispensed, they are operated simultaneously and a true price is computed. It is not unusual for the price of liquid such as gasoline to vary frequently, and when this occurs, it is of course necessary to set the gear shifting levers 72, 74 and 76 to this corresponding price.

In order then to eliminate the replaceable cards which it has been usual to apply to pumps of the non-computer type, and in some computer types, the unit or daily price indicator is provided. This unit price indicator is not manually operable per se, so that the operator at his discretion may set the daily price numeral wheels to correspond to the setting of the variator. However, in the constructions shown herein they are operated directly by the variator and are set simultaneously with the setting of the gear shifting levers to their selected positions.

Figure 5:
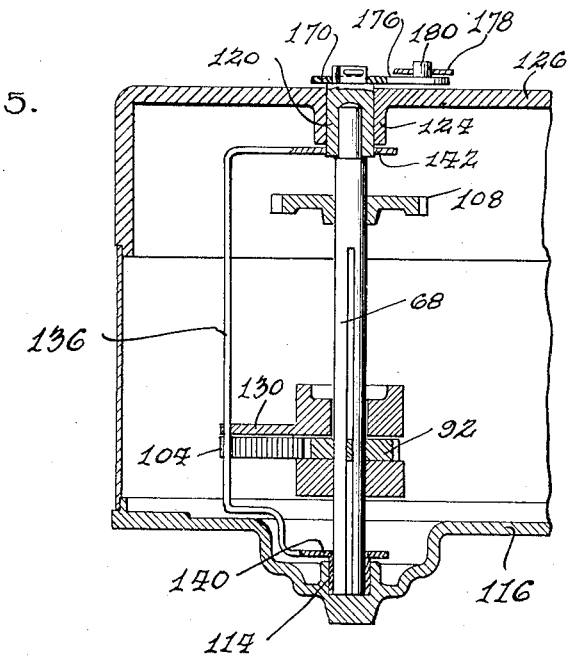
Figure 5 is an enlarged fragmentary sectional elevation through the variator housing showing the operating means associated with one of the gear shifting levers, the same being taken substantially in the plane as indicated by the line 5—5 of Figure 3.
Figure 6:
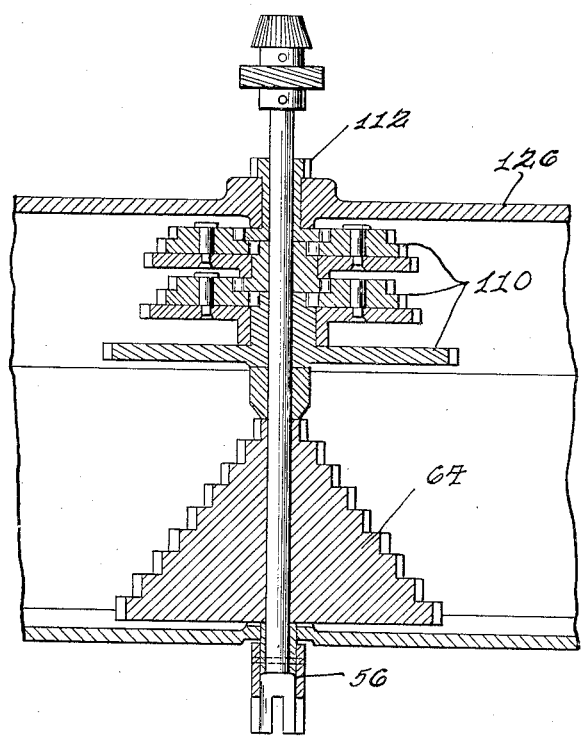
Figure 6 is an enlarged sectional elevation taken through the variator cone and associated differential gearing.

Each of the gear shifting levers being provided with similar mechanism for operating their respective daily price numeral wheels, it is sufficient that the structure illustrated in Figure 5 for the gear shifting lever 74 be shown in detail. The shafts 66, 68 and 70 are rotatably journaled as at 114 in the base 116. The upper ends of the shafts are rotatably journaled in the stub shafts 118, 120 and 122 which are rotatably journaled as at 124 in the top casing member 126 passing through said member. The gear shifting levers 72, 74 and 76 are provided with integral arms 128, 130 and 132, the ends of said arms being recessed and slidably embracing the adjacent bails 134, 136 and 138, said bails extending substantially parallel to their respective shafts 66, 68 and 70 and rotatably journaled on said shafts as at 140. The bails then extend upwardly and are non-rotatably mounted as at 142 on their respective stub shafts 118, 120 and 122 so that rotative movement of the gear shifting levers to selectively engage the gears 102, 104 and 106 with the respective steps of the gear cone and consequently engaging the selected pins in the apertures of the quadrants will cause a corresponding movement of the bails 134, 136 and 138 rotating the associated stub shafts.

Figure 4:
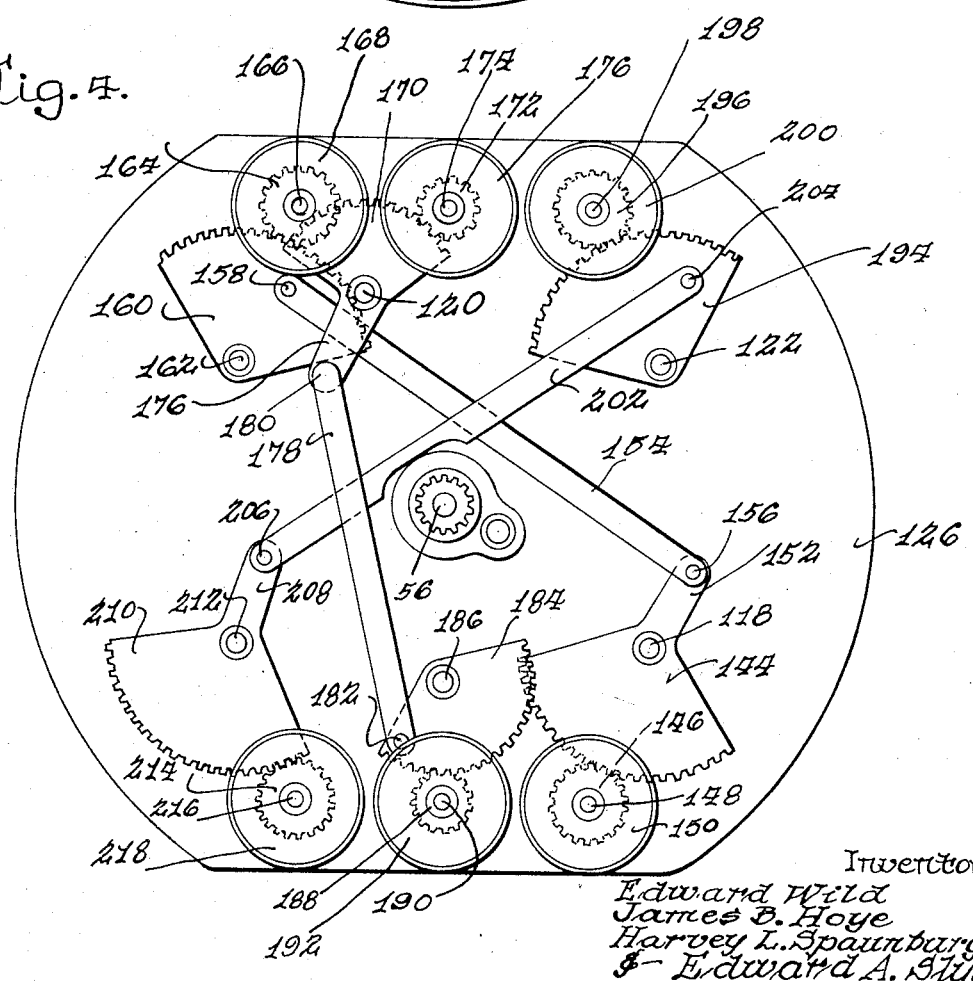
Figure 4 is a top plan view of the price synchronizing means, the same being taken substantially in the plane as indicated by the line 4—4 of Figure 2.

In the modification illustrated in Figure 4, the tenths stub shaft 118 is extended through the top casing member 126 of the variating mechanism, and is provided with the quadrant 144. The quadrant 144 meshes with the gear 146 provided on the shaft 148, said shaft being provided with the unit price indicating wheel or drum 150 for indicating tenths of a cent. The quadrant 144 is provided with the arm 152 to which the link 154 is pivoted as at 156. The link then extends diagonally across to the other side of the variator and is pivoted as at 158 to the quadrant 160 pivoted to the top 126 as at 162. The quadrant 160 meshes with the gear 164 provided on the shaft 166, said shaft being provided with the price wheel 168, also indicating tenths of a cent, the gearing being such that the same numerals will appear on opposite tenths wheels. It is to be understood of course that the same numerals will appear on opposite sides of the liquid dispensing apparatus, both for the tens wheel and the units daily price wheels.

The stub shaft 120 for the shaft 68 for computing full cent units is likewise extended through the top 126 and is provided with the quadrant 170 fixed thereto, said quadrant meshing with the gear 172 provided on the shaft 174, said shaft having the cent numeral wheel 176 provided thereon. The quadrant 170 is provided with the arm 176 to which the link 178 is pivotally connected as at 180. The link extends to the opposite side of the variator and is pivotally connected as at 182 to the quadrant 184, said quadrant being pivoted to the top 126 as at 186. The quadrant 184 meshes with gear 188 pivoted to the top as at 190 and provided with the opposite cent numeral wheel 192.

The stub shaft 122 for full tens of cents shaft 70 is extended through the top 126 and is provided with the quadrant 194 fixed thereon, said quadrant meshing with gear 196 provided on shaft 198, said shaft being provided with the tens of cents numeral wheel 200. The link 202 is pivotally connected as at 204 to the quadrant 194 and extends diagonally across the variator, being pivoted as at 206 to the arm 208 of the quadrant 210, said quadrant being pivoted to the top as at 212. The geared quadrant 210 meshes with the gear 214 pivoted as at 216 to the top 126 and provided with the opposite tens of cents numeral wheel 218.

It will be appreciated that setting any of the gear shifting levers 72, 74 or 76 along their respective quadrants 84, 86 or 88 causes a rotative movement of their respective bails 134, 136 and 138, and consequently the associated stub shafts 118, 120 and 122, moving the quadrants attached to said shafts whereby the prevailing price numeral wheels are set to show through their respective windows 220 the prevailing price, that is, are set to show the corresponding position of the gear shifting levers and the selective apertures 222 provided in the quadrants 84, 86 or 88.

Figure 3:
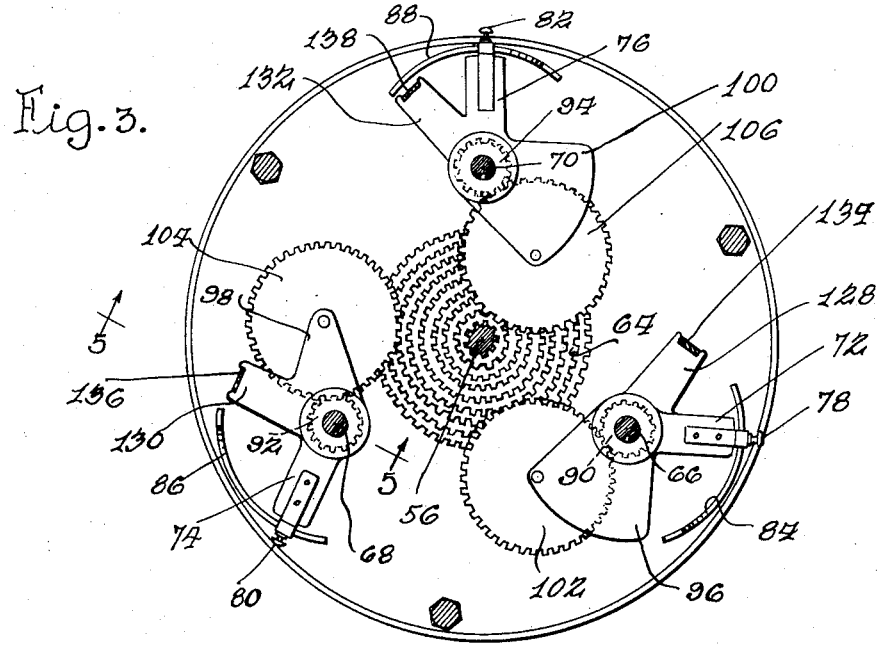
Figure 3 is an enlarged sectional plan view through the speed variating or computing means, the same being taken substantially in the plane as indicated by the line 3—3 of Figure 2.

In the form of construction illustrated in Figure 4, the shafts 66, 68 and 70 are shown as of slightly different spacing than that shown in Figure 3, so that it may be that the stub shafts might be properly spaced by a geared connection from the shafts within the variator to the portions of the shafts above the top 126, in which case the upper ends of shafts 66, 68 and 70 would be directly journaled in the top 126.

Referring now to the price synchronizing means illustrated in Figures 7, 8 and 9, the stub shafts 118, 120 and 122 extend through the top 126 of the variator and are respectively provided with the cranks 224, 226 and 228 fixed thereto. The crank 224 is provided with the pin 230 engageable in the slot 232 provided in the slidable rack link 234, opposite ends of the rack link being slidably supported on the bearings 236 and 238 provided at opposite sides of the top, said ends being provided with the racks 240 and 242 meshing with the idler gears 244 and 246 pivoted to the top at 248 and 250, and meshing with the pinions 252 and 254 pivoted as at 256 and 258 to the top and being provided with the tenths of a cent unit price wheels 260 and 262. The crank 226 is provided with the pin 264 loosely receivable in a suitable closed ear 266 provided in the link 268, said link underlying the link 234, opposite ends of the link 268 being pivotally connected as at 270 and 272 to the arms 274 and 276 of the quadrants 278 and 280. The toothed quadrants 278 and 280 are pivoted as at 282 and 284 to the top 126, and said quadrants mesh with pinions 286 and 288 pivoted as at 290 and 292 to the top, said pinions being provided with the cent numeral wheels 294 and 296.

The arm 228 is provided with the pin 298 receivable in the slot 300 provided in the rack link 302. Said rack link is supported on the bearings 304, 306 and 308 provided on the top, and is disposed between the links 234 and 268, the ends of said rack link 302 being provided with the racks 310 and 312 meshing with the idler pinions 314 and 316 pivoted as at 318 and 320 to the top, and meshing with the pinions 322 and 324 pivoted as at 326 and 328 to the top and provided with the tens of cents numeral wheels 330 and 332.

It will thus be seen that operation of the gear shifting levers causes rotative movement of the respective cranks 224, 226 and 228 through the bails and stub shafts to shift the rack links 234, 268 and 302 to operate the respective prevailing price wheels located at opposite sides of the liquid dispensing apparatus.

Referring now to the modification illustrated in Figures 10, 11 and 12, the same form of speed variator mechanism is provided, but a different form of prevailing price mechanism is contemplated. In this form of the device the windows 60 and 62 show the number of gallons dispensed and the computed price of the gallons dispensed, the counter or clock mechanism being provided with the amount numeral wheels 334 and the price numeral wheels 336 disposed in the respective windows 60 and 62. The clock or counter mechanism is illustrated generally at 338, shown particularly in Figure 12, the mechanism being substantially that shown in application Serial No. 2,282 filed January 17, 1935, it being understood that the variator construction is as shown in Figures 2, 3, 5 and 6 herein, and as described in detail in application Serial No. 628,868 filed August 15, 1932.

In this modification the stub shaft 118 is extended through the top 126 of the variator mechanism, and is provided with the toothed quadrant 340, said quadrant meshing with the gear 342 non-rotatably mounted on the shaft 344, the lower end of the shaft being journaled in the top 126. The shaft extends vertically through the counter mechanism 338, the upper end of the shaft being journaled as at 346 in a portion of the counter frame 348, said frame extending to opposite sides of the liquid dispensing apparatus and being supported on the side frame mounting 350 of the counter mechanism. The upper end of the shaft 344 is provided with the gear 352 which meshes with the gear 354 non-rotatably mounted on the shaft 356, said shaft being journaled at opposite sides of the liquid dispensing apparatus as at 358 on the frame member 348. As the daily price indicating means is the same for opposite sides of the liquid dispensing apparatus, it will be sufficient to describe the indicating mechanism for only one side of the liquid dispensing apparatus.

The ends of the shaft 356 are provided with the gears 360 meshing with the gears 362 provided on the journal 364. The journal 364 is rotatably mounted on the hub member 366 which in turn is rotatably mounted on the end 368 of the shaft 370. The journal member 364, outwardly of the gears 360 and 362, is provided with dished tenths disks 372, the outer peripheries 374 thereof being calibrated to show the tenths numerals indicated in the upper window 375 of Figure 12. The stub shaft 120 is provided with the toothed quadrant 376 which meshes with the gear 378 non-rotatably mounted on the shaft 380, said shaft being journaled at its upper end as at 382 in the frame 348 and its lower end in the top 126. The upper end of the shaft 380 is provided with the gear 384 which meshes with the gear 386 non-rotatably mounted on the shaft 388, said shaft extending to opposite sides of the liquid dispensing apparatus and being journaled in the counter frame as at 389. The ends of said shaft are provided with the gears 390 which mesh with the gears 392, said last named gears being non-rotatably mounted on the hub member 366. The hub member 36 is provided with the second dished disk 394, the periphery of said disk being calibrated to show the cent calculations.

The stub shaft 122 extends through the top 126 and is provided with the quadrant 396, said quadrant meshing with the gear 398 non-rotatably mounted on the shaft 400. The upper end of shaft 400 is journaled as at 402 in the counter frame 348, the lower end of said shaft being journaled in the top 126. The upper end of shaft 400 is provided with the gear 404 meshing with the gear 406, said gear being non-rotatably mounted on the shaft 370 extending to opposite sides of the liquid dispensing apparatus and being journaled in the counter frame as at 407. The ends of said shaft 370 are provided with the disk 408, said disk being graduated to show the tens computation.

It is thus seen that operation of the gear shifting lever 72, 74 and 76 operates the respective quadrants 340, 376 and 396 whereby the shafts 356, 388 and 370 are operated to rotate the disks 372, 394 and 408 to show the prevailing price in the window 376 as determined by the variator.

Referring now to the construction illustrated in Figures 13 and 14, there is shown an embodiment of Figure 7, being somewhat different in that a form of construction is shown wherein the prevailing price indicator wheels are disposed to be spaced outwardly of the variator mechanism in plan, and there is a variation in the connection of opposite indicator wheels. In this form of mechanism, the stub shafts 118, 120 and 122 extend through the top 126 of the variator and are respectively provided with the cranks 410, 412 and 414 fixed thereto. The crank 410 is provided with the pin 416 engageable in the slot 418 provided in the slidable link 420, said link being offset around the boss for the shaft 56 and being supported on the bearing 422 provided on the top 126.

The ends of said link 420 are pivotally connected as at 424 and 426 to the arms 428 and 430 of the quadrants 432 and 434, said quadrants being pivoted as at 436 and 438 to the outwardly projecting supporting frames 440 and 442 bolted or otherwise secured as at 444 to the respective sides of the top 126 or other stationary portion of the variator. The quadrants mesh with suitable pinions 446 and 448 pivoted as at 450 and 452 to said frame and being provided with the fractional or tenths cent indicating numeral wheels 454 and 456.

The crank 412 is provided with the pin 458 slidably received in the slot 460 provided in the offset link 462, said link being suitably and slidably supported on spaced bearings 464 and 466. The ends of the link 462 are pivoted as at 468 and 470 to the arms 472 and 474 of the quadrants 476 and 478, said quadrants being pivotally supported as at 480 and 482 on the supporting members 440 and 442. The quadrants mesh with the pinions 484 and 486 pivotally mounted as at 488 and 490 on the supporting members 440 and 442, said pinions being provided with the units or cent indicator numeral wheels 492 and 494.

The crank 414 is provided with the pin 496 slidably engaged in the slot 498 of the offset link 500, said link being slidably supported on the bearing 502 provided on the top 126. The ends of the link 500 are pivoted as at 504 and 506 to the arms 508 and 510 of the quadrants 512 and 514 pivotally mounted as at 516 and 518 to said frames 440 and 442. The quadrants 512 and 514 mesh with the pinions 520 and 522 pivotally mounted as at 524 and 526 to the supporting members 440 and 442, said pinions being provided with the tens indicator numeral wheels 528 and 530.

As before, operation of the variator or gear shifting levers serves to rotate the cranks 410, 412 and 414 through the bails, as already described, to move the links to cause the respective quadrants to rotate the indicating numeral wheels to show the prevailing price to which the variator is set.

It is to be understood that we do not wish to be limited by the exact embodiments of the device shown which are merely by way of illustration and not limitation, as various and other forms of the device will of course be apparent to those skilled in the art without departing from the spirit of the invention or the scope of the claims.

We claim:

1. In speed variator mechanism, the combination of a shaft having gears of varying diameter thereon, a plurality of secondary shafts disposed adjacent said first named shaft, gears slidable with respect to said secondary shafts and selectively engageable with the gears on said first named shaft, gear shifting levers for selectively engaging the gears of said secondary shafts with the first named gears, a driven shaft rotatably mounted on said first named shaft, gears differentially arranged between said driven shaft and said second named shafts whereby the driven shaft is rotated in accordance with the combined rotation of said secondary shafts, indicator means corresponding in number to the number of gear shifting levers, an oscillatable bail loosely mounted on each of said secondary shafts and slidably connected to its adjacent gear shifting lever, and connecting means between each bail and its corresponding indicator means whereby said indicator means shows the setting of said first and second named gears thereby indicating the relative rates of rotation between said first named shaft and said driven shaft.

2. In speed variator mechanism, the combination of a shaft having gears of varying diameter thereon, a plurality of secondary shafts disposed adjacent said first named shaft, gears slidable with respect to said secondary shafts and selectively engageable with the gears on said first named shaft, gear shifting levers for selectively engaging the gears of said secondary shafts with the first named gears, a driven shaft rotatably mounted on said first named shaft, gears differentially arranged between said driven shaft and said second named shafts whereby the driven shaft is rotated in accordance with the combined rotation of said secondary shafts, an oscillatable bail loosely mounted on each of said secondary shafts and slidably connected to its adjacent gear shifting lever, indicator mechanism, said indicator mechanism including a shaft having a calibrated disk thereon, a hub rotatably mounted on said shaft and having a calibrated disk thereon, a calibrated disk rotatably mounted on said hub adjacent said other disks, connecting means operated by said bails and associated with said last named shaft, hub and disk whereby the setting of said gear shifting levers effects a corresponding setting of the indicating means.

3. In speed variator mechanism, the combination of a shaft having gears of varying diameter thereon, a plurality of secondary shafts disposed adjacent said first named shaft, gears slidable with respect to said secondary shafts and selectively engageable with the gears on said first named shaft, gear shifting levers for selectively engaging the gears of said secondary shafts with the first named gears, a driven shaft rotatably mounted on said first named shaft, gears differentially arranged between said driven shaft and said second named shafts whereby the driven shaft is rotated in accordance with the combined rotation of said secondary shafts, an oscillatable bail loosely mounted on each of said secondary shafts and slidably connected to its adjacent gear shifting lever, a crank operated by each of said bails, a pair of numeral wheels for each crank, links operatively associated with the respective cranks and corresponding numeral wheels whereby the operation of said gear shifting levers to set the variator correspondingly sets pairs of numeral wheels to show the numerical setting of said variator to thereby indicate the relative rates of rotation between said first named shaft and said driven shaft.

4. In speed variator mechanism, the combination of a shaft having gears of varying diameter thereon, a plurality of secondary shafts disposed adjacent said first named shaft, gears slidable with respect to said secondary shafts and selectively engageable with the gears on said first named shaft, gear shifting levers for selectively engaging the gears of said secondary shafts with the first named gears, a driven shaft rotatably mounted on said first named shaft, gears differentially arranged between said driven shaft and said second named shafts whereby the driven shaft is rotated in accordance with the combined rotation of said secondary shafts, an oscillatable bail loosely mounted on each of said secondary shafts and slidably connected to its adjacent gear shifting lever, a quadrant operated by each of said bails, a pair of numeral wheels for each quadrant, each of said quadrants being operatively associated with a corresponding numeral wheel, and means operatively associated with said quadrants and the other corresponding numeral wheel whereby operation of said gear shifting levers to set the variator correspondingly sets pairs of numeral wheels to show the numerical setting of said variator to thereby indicate the relative rates of rotation between said first named shaft and said driven shaft.

5. In speed variator mechanism, the combination of a shaft having gears of varying diameter thereon, a plurality of secondary shafts disposed adjacent said first named shaft, gears slidable with respect to said secondary shafts and selectively engageable with the gears on said first named shaft, gear shifting levers for selectively engaging the gears of said secondary shafts with the first named gears, a driven shaft rotatably mounted on said first named shaft, gears differentially arranged between said driven shaft and said second named shafts whereby the driven shaft is rotated in accordance with the combined rotation of said secondary shafts, an oscillatable bail loosely mounted on each of said secondary shafts and slidably connected to its adjacent gear shifting lever, a crank operated by each of said bails, a pair of numeral wheels for each crank, links operativey associated with certain of the respective cranks and the diagonally corresponding numeral wheels, a quadrant associated with each of the remaining numeral wheels, a link connecting said quadrants, said link being connected to one of said cranks whereby operation of said gear shifting levers to set the variator correspondingly sets pairs of numeral wheels to show the numerical setting of said variator to thereby indicate the relative rates of rotation between said first named shaft and said driven shaft.

6. In speed variator mechanism, the combination of a shaft having gears of varying diameter thereon, a plurality of secondary shafts disposed adjacent said first named shaft, gears slidable with respect to said secondary shafts and selectively engageable with the gears on said first named shaft, gear shifting levers for selectively engaging the gears of said secondary shafts with the first named gears, a driven shaft rotatably mounted on said first named shaft, gears differentially arranged between said driven shaft and said second named shafts whereby the driven shaft is rotated in accordance with the combined rotation of said secondary shafts, an oscillatable bail loosely mounted on each of said secondary shafts and slidably connected to its adjacent gear shifting lever, a crank operated by each of said bails, a pair of numeral wheels for each crank, a quadrant operatively associated with each numeral wheel, links connecting the quadrants of corresponding numeral wheels, said cranks being loosely connected to the respective links whereby operation of said gear shifting levers to set the variator correspondingly sets pairs of numeral wheels to show the numerical setting of said variator to thereby indicate the relative rates of rotation between said first named shaft and said driven shaft.

7. In indicator mechanism, the combination of spaced pivotally mounted indicating wheels, a slidable member operatively connected to said wheels and so constructed and arranged as to rotate each of said wheels the same amount and proportionately to the movement of said member, operating means for said slidable member, said operating means including a shaft, a lever slidably mounted on said shaft, a bail rotatably mounted on said shaft and engaged by said lever, movement of said lever around said shaft causing corresponding movement of said bail, and an operative connection between said bail and said slidable member.

8. In indicator mechanism, the combination of spaced pivotally mounted indicating wheels, operating means for said wheels, said operating means including a shaft, a lever slidably mounted on said shaft, a bail rotatably mounted on said shaft and engaged by said lever, movement of said lever around said shaft causing corresponding movement of said bail, a pivoted quadrant connected to said bail and to one of said indicating wheels, another pivoted quadrant connected to the other of said indicating wheels, and a connection between said quadrants.

9. In indicator mechanism, the combination of spaced pivotally mounted indicating wheels, operating means for said wheels, said operating means including a shaft, a lever slidably mounted on said shaft, a bail rotatably mounted on said shaft and engaged by said lever, movement of said lever around said shaft causing corresponding movement of said bail, a crank connected to said bail and adapted to be rotated by the movement of said lever, and a connection between said lever and each of said wheels.

10. In indicator mechanism, the combination of spaced pivotally mounted indicating wheels, operating means for said wheels, said operating means including a shaft, a lever slidably and rotatably mounted on said shaft, an operative connection between said lever and said indicating wheels including means rotatable with said lever connected to said wheels, and a loose connection between said lever and means for permitting relative sliding movement between said lever and means without rotating said wheels.

11. In indicating mechanism, the combination of an indicating wheel provided with a pinion, a pivotally mounted quadrant for rotating said pinion, operating means for moving said quadrant, said operating means including a pivotally and slidably mounted lever operatively connected to said quadrant, the connection including means rotatable with said lever connected to said wheels, and a loose connection between said lever and means for permitting relative sliding movement between said lever and means without rotating said quadrant.

12. In indicating mechanism, the combination of an indicating wheel provided with a pinion, operating means for rotating said wheel, said operating means including a pivotally and slidably mounted lever, a crank operatively connected to said lever through means including a connection rotatable with said lever but permitting relative sliding movement between said lever and means so that rotation of said lever rotates said crank but maintains said crank immovable upon sliding movement of said lever, and means interposed between said crank and pinion for rotating said pinion.

13. In indicator mechanism, the combination of spaced pivotally mounted indicating wheels, pinions for rotating said wheels, a slidable member having teeth engaging said pinions, operating means for moving said sliding member, said operating means including a pivotally and slidably mounted lever, a crank operatively connected to said lever through means including a connection rotatable with said lever but permitting relative sliding movement between said lever and means so that rotation of said lever rotates said crank but maintains said crank immovable upon sliding movement of said lever, and a loose connection between said crank and slidable member.

14. In indicator mechanism, the combination of a shaft, an indicating member fixed to said shaft, a hub rotatably mounted on said shaft and provided with an indicating member fixed thereto, a second shaft connected to said hub, separate operating means for said shafts, each of said operating means including a geared connection to the respective shafts, a secondary shaft for each geared connection, a lever slidably and rotatably mounted on each secondary shaft, each said lever being connected to said geared connection through means including a connection rotatable with said lever but permitting relative sliding movement between said lever and means so that rotation of said lever operates said geared connection but sliding movement does not operates said geared connection.

15. In a device of the character described, the combination of a plurality of gears concentrically arranged, supplemental shafts disposed adjacent said gears, a movable gear supporting arm disposed on each shaft, a gear supported thereby and selectively engageable with said first named gears, indicating means, and operative connections between said arms and indicating means, each of said connections including means rotatable with the respective arms and connected to said indicating means, and a loose connection between said arms and means for permitting relative sliding movement between said arms and means so that movement of said second gears into selected engagement with said first gears causes said indicating means to be moved to show the setting of said gears.

16. In a device of the character described, the combination of registering mechanism, variator mechanism for operating said registering mechanism, said variator mechanism including a plurality of shafts, movable members on said shafts for selectively setting said variator mechanism, indicator mechanism for showing the setting of said variator mechanism, said indicator mechanism including a plurality of rotatably mounted indicator wheels, a slidably mounted link extending between and operatively associated with certain of said wheels whereby movement of said link rotates said wheels an amount corresponding to the movement of said link, and means for moving said link in accordance with the movement of one of said movable members, said means including a crank loosely connected to said link and adapted to be operated in accordance with the movement of the associated movable member.

17. In a device of the character described, the combination of registering mechanism, variator mechanism for operating said registering mechanism, said variator mechanism including a plurality of shafts, movable members on said shafts for selectively setting said variator mechanism, indicator mechanism for showing the setting of said variator mechanism, said indicator mechanism including a plurality of rotatably mounted indicator wheels, a pinion on said wheels, a slidably mounted rack link extending between and having the racks thereof operatively connected to certain of the pinions whereby movement of said link rotates said wheels an amount corresponding to the movement of said link, and means for moving said link in accordance with the movement of one of said movable members, said means including a crank loosely connected to said link and adapted to be operated in accordance with the movement of the associated movable member.

18. In a device of the character described, the combination of registering mechanism, variator mechanism for operating said registering mechanism, said variator mechanism including a plurality of shafts, movable members on said shafts for selectively setting said variator mechanism, indicator mechanism for showing the setting of said variator mechanism, said indicator mechanism including a plurality of rotatably mounted indicator wheels, pivotally mounted oscillatory members mounted adjacent each of said wheels and connected thereto, a link extending between and pivotally connected to the spaced oscillatory members whereby movement of said link rotates said wheels an amount corresponding to the movement of said link, and means for moving said link in accordance with the movement of one of said movable members, said means including a crank loosely connected to said link and adapted to be operated in accordance with the movement of the associated movable member.

19. In a device of the character described, the combination of registering mechanism, variator mechanism for operating said registering mechanism, said variator mechanism including a plurality of shafts, movable members on said shafts for selectively setting said variator mechanism, indicator mechanism for showing the setting of said variator mechanism, said indicator mechanism including a plurality of rotatably mounted indicator wheels, a pinion on said wheels, a quadrant pivotally mounted adjacent each of said wheels and meshing with the associated pinions, a link pivotally connecting each of said quadrants, and means for moving said links in accordance with the movement of one of said movable members whereby movement of said links rotates said wheels an amount corresponding to the movement of said links, said means including a crank loosely connected to said links and adapted to be operated in accordance with the movement of the associated movable member.

EDWARD A. SLYE.
EDWARD WILD.
JAMES B. HOYE.
HARVEY L. SPAUNBURG.